(12) United States Patent
Steinke

(10) Patent No.: US 11,921,678 B2
(45) Date of Patent: Mar. 5, 2024

(54) USING A LOGICAL OPERATION COALESCER TO CONCURRENTLY UPDATE FILE SYSTEM OBJECTS

(71) Applicant: Dell Products L.P., Round Rock, TX (US)

(72) Inventor: Ron Steinke, Tacoma, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 52 days.

(21) Appl. No.: 17/587,531

(22) Filed: Jan. 28, 2022

(65) Prior Publication Data
US 2023/0244641 A1    Aug. 3, 2023

(51) Int. Cl.
*G06F 17/00*   (2019.01)
*G06F 7/00*    (2006.01)
*G06F 16/176*  (2019.01)
*G06F 16/185*  (2019.01)

(52) U.S. Cl.
CPC ........ *G06F 16/1774* (2019.01); *G06F 16/185* (2019.01)

(58) Field of Classification Search
CPC ............................ G06F 16/1774; G06F 16/185
USPC ........................................................ 707/704
See application file for complete search history.

(56) References Cited

U.S. PATENT DOCUMENTS

| 8,560,511 | B1 | 10/2013 | Matthews et al. |
| 2005/0022047 | A1 | 1/2005 | Chandrasekaran |
| 2005/0289143 | A1* | 12/2005 | Oshri ...................... G06F 12/00 |
| 2006/0136508 | A1* | 6/2006 | Idicula ................ G06F 16/1774 |
| | | | 707/999.203 |
| 2007/0005604 | A1* | 1/2007 | Jain ........................ G06F 16/188 |
| 2008/0086470 | A1* | 4/2008 | Graefe ................ G06F 16/2246 |
| 2014/0310317 | A1* | 10/2014 | Spillane .............. G06F 16/9027 |
| | | | 707/803 |
| 2016/0371318 | A1 | 12/2016 | Hillel et al. |
| 2017/0199704 | A1 | 7/2017 | Guney |
| 2022/0300335 | A1 | 9/2022 | Venkatesh et al. |

OTHER PUBLICATIONS

Steinke, Ron. "Using a Logical Operation Coalescer to Enable Recovery From Update Failures to a Shared Data Store" U.S. Appl. No. 17/587,310, filed Jan. 28, 2022, 45 pages.
Notice of Allowance dated Jan. 25, 2023 for U.S. Appl. No. 17/587,310, 46 pages.

* cited by examiner

*Primary Examiner* — Pavan Mamillapalli
(74) *Attorney, Agent, or Firm* — Amin, Turocy & Watson, LLP

(57) ABSTRACT

The technologies described herein are generally directed toward using logical operation coalescing to concurrently update file system objects. According to an embodiment, a system can comprise a processor and a memory that can enable performance of operations including receiving a first data update from first node equipment for a first part of an entry of a data structure comprising multiple linked entries, and a second data update from second node equipment for a second part of the entry of the data structure. The operations can further include locking, by the first computing equipment, the first part and the second part of the entry. Further, the operations can include, based on the first data update and the second data update, updating, by the first computing equipment, respectively, the first part and the second part of the entry.

20 Claims, 10 Drawing Sheets

USING A LOGICAL OPERATION COALESCER TO CONCURRENTLY UPDATE FILE SYSTEM OBJECTS

BACKGROUND

Modern data storage systems can facilitate the storage and manipulation of many types of data by large numbers of client nodes. Different approaches can be used to improve the security, performance, and scalability of data storage, retrieval, and manipulation operations. In some circumstances different approaches can conflict. For example, to improve scalability of data access capabilities, systems can increase the numbers of clients that can access data concurrently. Concurrent access however can interfere with the security of the accessed data, e.g., for some systems, changes made by multiple clients must be actively managed to remain coherent.

Different ways to promote scalable coherence include the use exclusive locks of different scope, as well as selective caching and serialization of changes. Within complex data storage systems, problems can occur when approaches to maintaining change coherence are applied in different circumstances. These problems can be enhanced when similar approaches to improving coherence and scalability are applied to different types of client and stored data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to receive, by first computing equipment comprising a processor, a first data update from first node equipment for a first part of an entry of a data structure comprising multiple linked entries, and a second data update from second node equipment for a second part of the entry of the data structure. The system can include an additional instruction to lock, by the first computing equipment, the first part and the second part of the entry. Additional instructions can include an instruction to, based on the first data update and the second data update, update, by the first computing equipment, respectively, the first part and the second part of the entry.

An example method can comprise receiving, by first computing equipment comprising a processor, a first data update from first node equipment for a first part of an entry of a data structure comprising multiple linked entries, and a second data update from second node equipment for a second part of the entry of the data structure. The method can further include locking, by the first computing equipment, the first part and the second part of the entry. Further, the method can include, based on the first data update and the second data update, updating, by the first computing equipment, respectively, the first part and the second part of the entry.

An example non-transitory computer-readable medium can comprise instructions that, in response to execution, cause a system comprising a processor to perform operations. These operations can comprise receiving, by first computing equipment comprising a processor, a first data update from first node equipment for a first part of an entry of a data structure comprising multiple linked entries, and a second data update from second node equipment for a second part of the entry of the data structure. The operations can further include, based on the resource sharing communication locking, by the first computing equipment, the first part and the second part of the entry. Further, operations can further include, based on the first data update and the second data update, updating, by the first computing equipment, respectively, the first part and the second part of the entry.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate using logical operation coalescing to facilitate concurrently update file system objects. One or more embodiments can use different approaches to, without adversely affecting system performance, supporting the persistence of small logical updates (e.g., to file system data structures) while improving system scalability, performance, and coherency.

As is understood by one having skill in the relevant art(s), given the description herein, the implementation(s) described herein are non-limiting examples, and variations to the technology can be implemented. For instance, even though many examples described herein discuss concurrent changes to file system objects (e.g., directories, and snapshot tracking files), the technologies described herein can be used in many applicable circumstances, e.g., when approaches to concurrency and coherence are applied to disparate types of data. In addition, notwithstanding the examples discussed herein being directed. to changes to inode data and the locking of B-tree data structures, the approaches described and suggested herein can apply to other types of stored data, and different types of lockable data structures. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
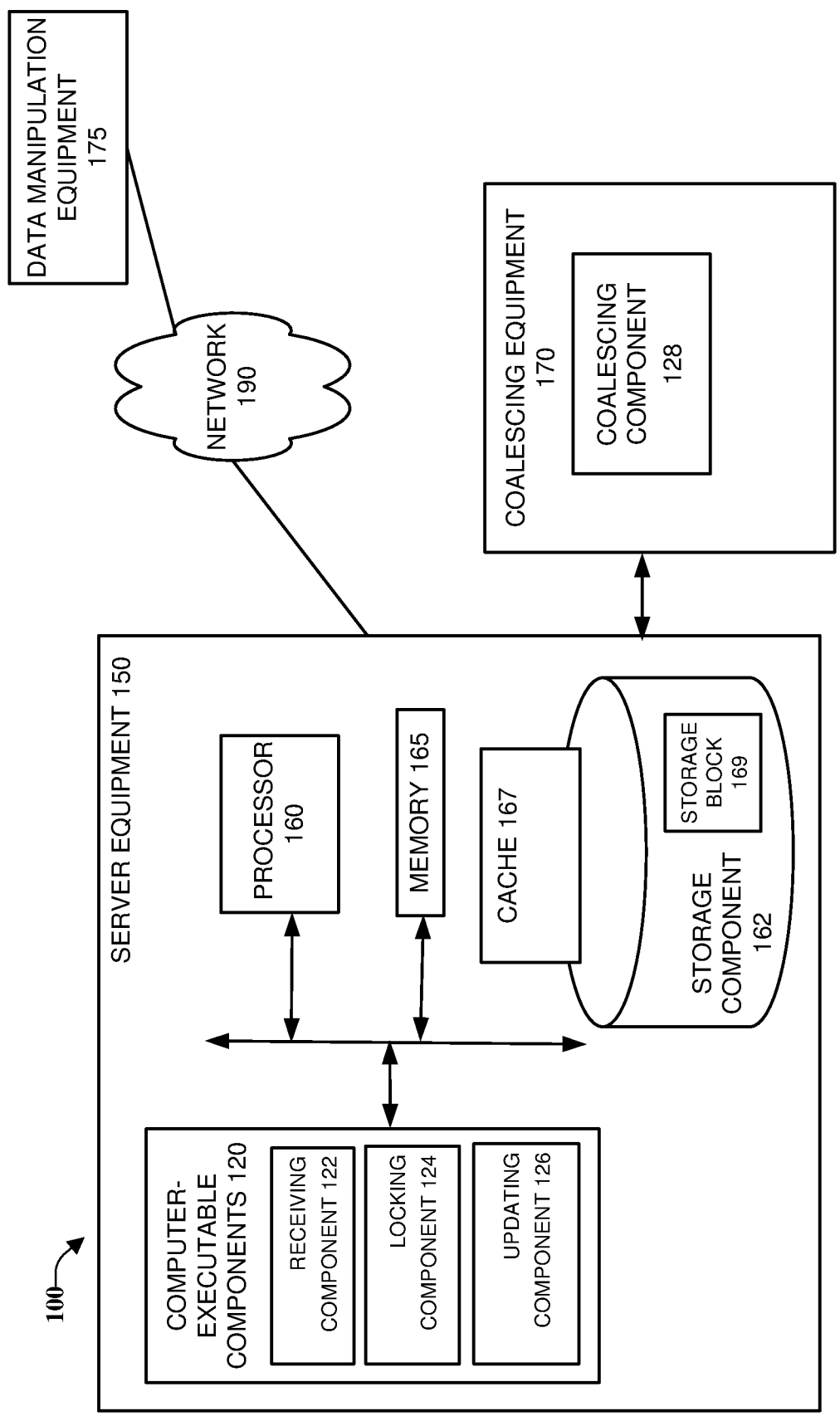
FIG. 1 is an architecture diagram of an example system that can facilitate using coalescing operations to concurrently update stored data, in accordance with one or more embodiments.

FIG. 1 is an architecture diagram of an example system 100 that can facilitate using coalescing operations to concurrently update stored data, in accordance with one or more embodiments. For purposes of brevity, description of like elements and/or processes employed in other embodiments is omitted. As depicted, system 100 includes server equipment 150 connected to coalescing equipment 170 and data manipulation equipment 175, via network 190. As depicted, server equipment 150 can include storage component 162 with storage block 169, and as further depicted, coalescing equipment 170 can include coalescing component 128.

According to multiple embodiments, server equipment 150 can include memory 165 that can store one or more computer and/or machine readable, writable, and/or executable components 120 and/or instructions. In embodiments, server equipment 150 can further include processor 160. In one or more embodiments, computer-executable components 120, when executed by processor 160, can facilitate performance of operations defined by the executable component(s) and/or instruction(s). Computer executable components 120 can include receiving component 122, locking component 124, updating component 126, and other components described or suggested by different embodiments described herein, that can improve the operation of system 100.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, cache 167 can comprise non-volatile random access memory (NVRAM), with different uses including journaled manipulation of storage component 162 data and the enabling of concurrent updating of some types of stored data, in accordance with one or more embodiments.

It is understood that the computer processing systems, computer-implemented methods, apparatus, and computer program products described herein employ computer hardware and/or software to solve problems that are highly technical in nature (e.g., handling complex concurrent updates of data at the logical and physical levels), that are not abstract and cannot be performed as a set of mental acts by a human. For example, a human, or even a plurality of humans, cannot efficiently handle the locking and merging of concurrent changes with a level of accuracy and/or efficiency as the various embodiments described herein.

In one or more embodiments, memory 165 can store computer and/or machine readable, writable, and/or executable components 120 and/or instructions that, when executed by processor 160, can facilitate execution of the various functions described herein relating to receiving component 122, locking component 124, updating component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations receive, by first computing equipment comprising a processor, a first data update from first node equipment for a first part of an entry of a data structure comprising multiple linked entries, and a second data update from second node equipment for a second part of the entry of the data structure. As discussed with FIGS. 3-5 below, one or more embodiments can receive (e.g., by receiving component 122), a first data update from first node equipment (e.g., data manipulation equipment) for a first part of an entry of a data structure (e.g., linked to storage block 169) comprising multiple linked entries, and a second data update from second node equipment for a second part of the entry of the data structure.

In one or more embodiments, computer executable components 120 can further be used in connection with implementing additional systems, devices, components, and/or computer-implemented operations shown and described in connection with FIG. 1 or other figures disclosed herein. In another example, memory 165 can store executable instructions that can facilitate generation of locking component 124, which can in some implementations, lock the first part and the second part of the entry. As discussed with FIGS. 3-5 below, one or more embodiments can lock (e.g., by locking component 124) the first part and the second part of the entry.

In another example, memory 165 can store executable instructions that can facilitate generation of updating component 126, which can in some implementations, can, based on the first data update and the second data update, updating, by the first computing equipment, respectively, the first part and the second part of the entry. As discussed with FIGS. 3-5 below, one or more embodiments can, based on the first data update and the second data update (e.g., by updating component 126) respectively, the first part and the second part of the entry.

It is appreciated that the embodiments of the subject disclosure depicted in various figures disclosed herein are for illustration only, and as such, the architecture of such embodiments are not limited to the systems, devices, and/or components depicted therein. For example, in some embodiments, server equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that server equipment 150, coalescing equipment 170, and other devices discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as server equipment 150. For example, two or more of server equipment 150, coalescing equipment 170, and data manipulation equipment 175 can all be separate subsystems running in the kernel of a computing device as well as operating on separate network equipment, as depicted in FIGS. 1 and 2.

As described in some examples below, an example system that can benefit in some circumstances from the use of one or more embodiments, is a system that can facilitate sharing resources among networked computing devices, e.g., file storage systems and databases. In some implementations, system 100 can be a file storage system that implements data protection systems. In different implementations, data protection systems can benefit from the concurrent operations that one or more embodiments can facilitate, e.g., via a selection of locks of different scope.

Example data protection systems which can employ one or more of the approaches described with embodiments herein include, but are not limited to EMC ISILON®, an example network attached storage (NAS) platform provided by DELL EMC, Inc. Example storage array devices which can employ one or more of the approaches described with embodiments herein include, but are not limited to, POWERMAX enterprise data storage array system provided by DELL EMC, Inc.

Figure 2:
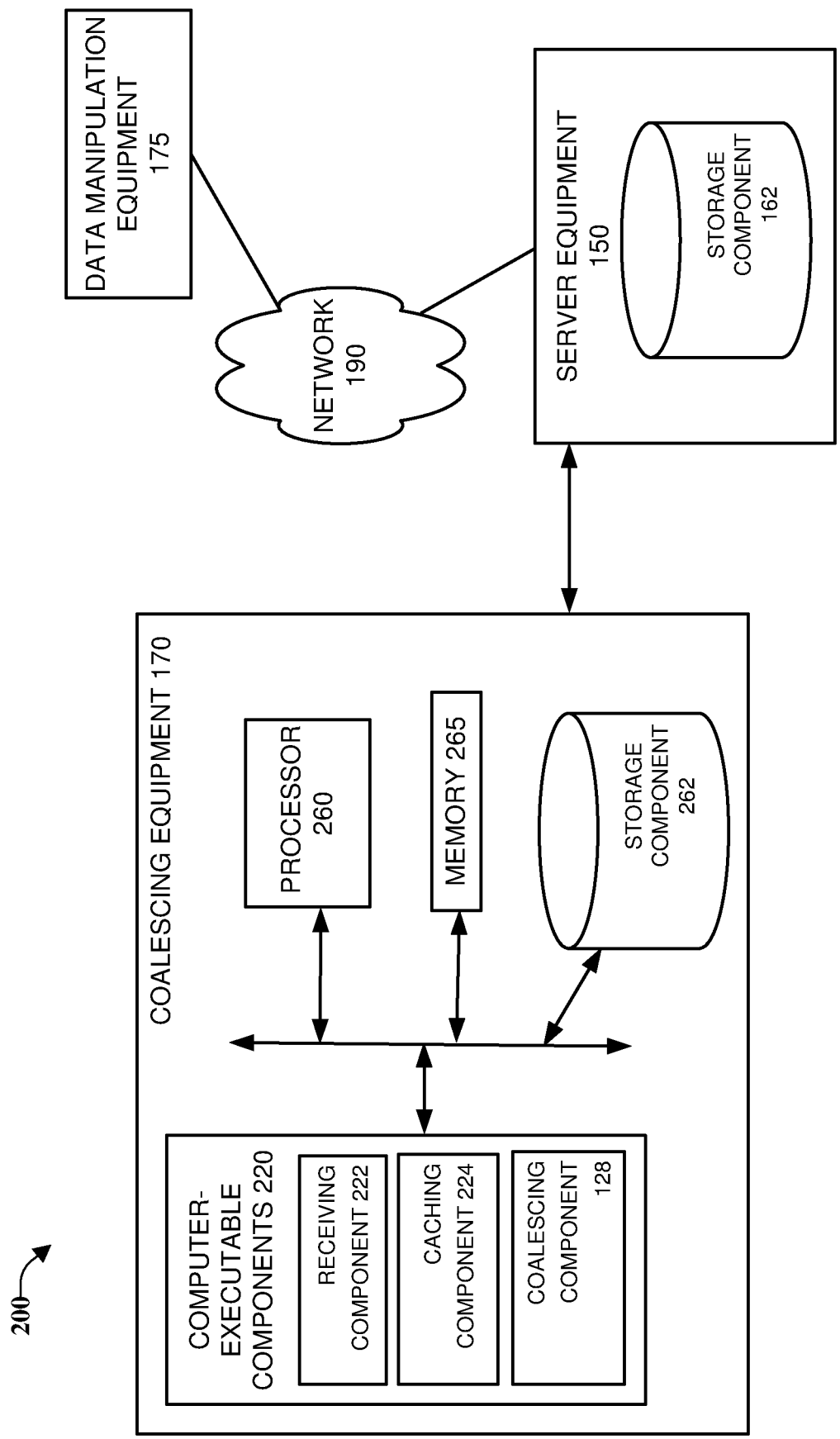
FIG. 2 is an architecture diagram of an example system that can facilitate using coalescing equipment to facilitate concurrent updates of file system objects, in accordance with one or more embodiments.

FIG. 2 is an architecture diagram of an example system 200 that can facilitate using coalescing equipment to facilitate concurrent updates of file system objects, in accordance with one or more embodiments. For purposes of brevity, description of like elements and/or processes employed in other embodiments is omitted. As depicted, system 200 includes coalescing equipment 170 connected to server equipment 150 and data manipulation equipment 175, via network 190.

In embodiments, coalescing equipment 170 can include processor 260 (e.g., similar to processor 160) and storage device 262, e.g., similar to storage component 162. According to multiple embodiments, coalescing equipment 170 can include memory 265 that can store one or more computer and/or machine readable, writable, and/or executable components 220 and/or instructions, e.g., similar to the capabilities of memory 165, discussed above. In one or more embodiments, computer-executable components 220, when executed by processor 260, can facilitate performance of operations defined by the executable component(s) and/or instruction(s). Computer executable components 220 can include receiving component 222, caching component 224, coalescing component 128, and other components described or suggested by different embodiments described herein, e.g., that can improve the operation of system 200, in accordance with one or more embodiments.

In accordance with some embodiments, memory 265 can store one or more computer and/or machine readable, writable, and/or executable components 220 and/or instructions that, when executed by processor 260, can facilitate performance of operations defined by the executable component(s) and/or instruction(s). In one or more embodiments, processor 260 can facilitate performance of operations defined by executable components including receiving component 222, caching component 224, and other components described or suggested by different embodiments described herein, that can improve the operation of system 200.

In an example implementation of coalescing equipment 170, memory 265 can store executable instructions that can facilitate generation of receiving component 222, which in some implementations, can receive a first data update for a first part of a node of a hierarchical data structure, and a second data update for a second part of the node, wherein the first part and the second part of the node comprise file directory data and respectively correspond to a first file and a second file arranged in a file directory. As discussed with FIGS. 3-5 below, one or more embodiments can, receive a first data update for a first part of a node of a hierarchical data structure, and a second data update for a second part of the node, wherein the first part and the second part of the node comprise file directory data and respectively correspond to a first file and a second file arranged in a file directory.

Continuing this example implementation example, memory 265 can store executable instructions that can facilitate generation of caching component 224, which in some implementations, can, based on the first data update and the second data update, generate a first cache entry of a cache and a second cache entry of the cache. Continuing this example implementation example, memory 265 can store executable instructions that can facilitate generation of coalescing component 128, which in some implementations, can, based on an aggregated update generated from the first cache entry and the second cache entry, initiate updating the node.

Figure 3:
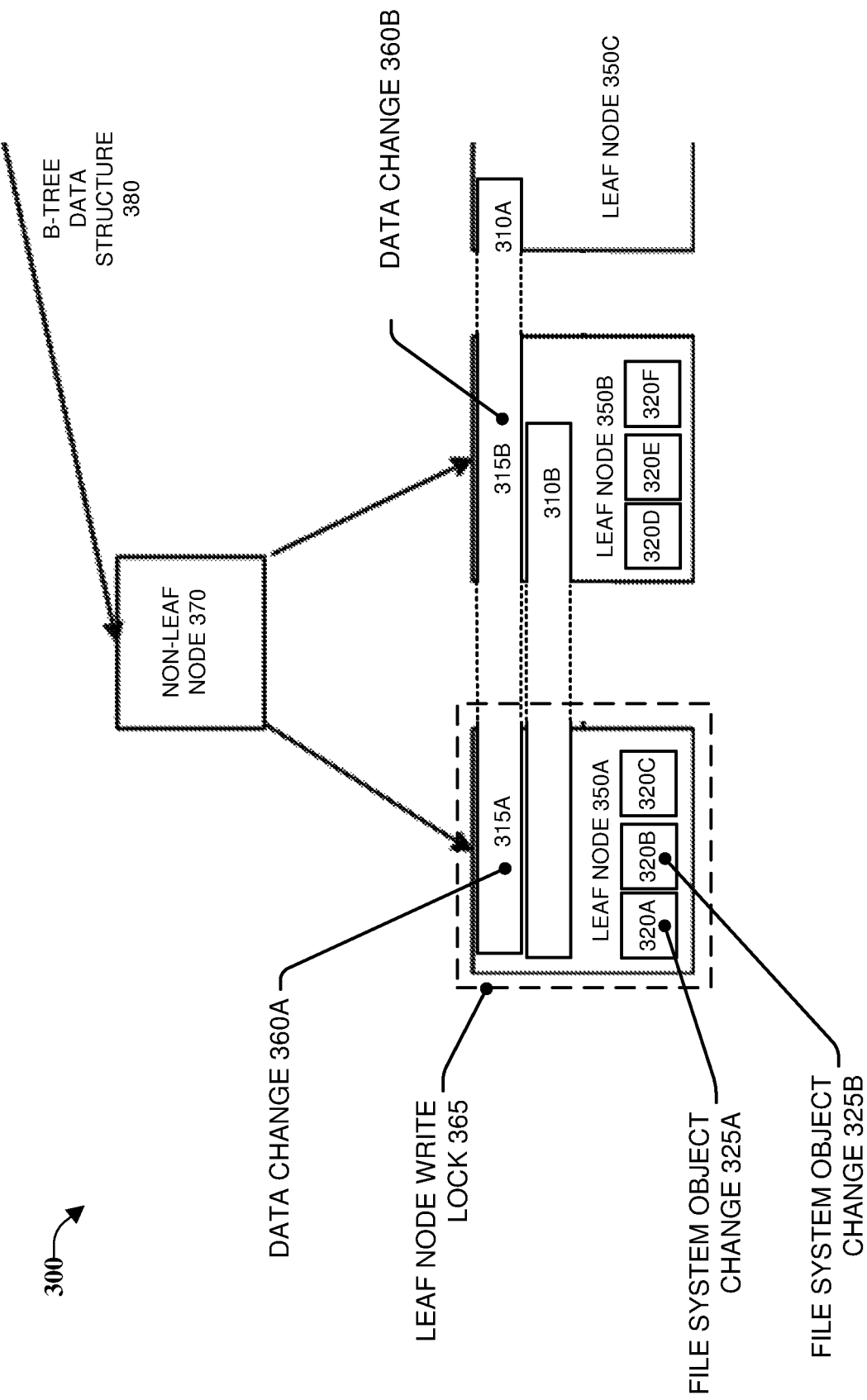
FIG. 3 is an architecture diagram of a non-limiting example system that illustrates the relationship of different locking approaches that can be used by one or more embodiments.

FIG. 3 is an architecture diagram of a non-limiting example system 300 that illustrates the relationship of different locking approaches that can be used by one or more embodiments. For purposes of brevity, description of like elements and/or processes employed in other embodiments is omitted. As depicted, system 300 references a B-tree data structure 380 (not fully shown) with non-leaf node 370 linked with leaf nodes 350A-B. Leaf node 350C is partially depicted and is connected to another non-leaf node (not shown). Data changes 360A-B are labeled as to be performed on file data 310A. At 325A-B, file system object changes are depicted a changing file system object descriptors 320A-B, respectively. In addition, based on operations to be discussed below, leaf node write lock 365 prevents changes to the items referenced by the leaf node 350A-C.

System 300 includes file data 310A-B spanning leaf nodes 350A-B, as well as file system object descriptors 320A-F divided between leaf node 350A and 350B. It should be noted that file data 310A-B and file system object descriptors 320A-F are depicted as being stored in B-tree data structure 380 for convenience of discussion, with modern data systems beneficially storing this B-tree data in different B-trees or other data structures.

One or more embodiments can facilitate concurrent writes from multiple initiators to the stored non-file objects. As used herein, non-file objects can include, but are not limited to, descriptions of file system objects stored in data structures, such as index node (inode) data structures, which can store the attributes and disk block locations of the data of the file system object. Examples can include file directories, snapshot tracking files (e.g., storing logical inode numbers (LINs) for all files which have data on a snapshot), and system B-trees (SBTs), which can, in some implementation, store administrative information, such as descriptions of data modified by a system operation.

In one or more embodiments, the data updates received from data manipulation equipment 175 can be data updates a change to a file system object, e.g., a directory. Example updates can include changes to inode metadata of the directory, such as permissions associated with the directory, last modification time, and references to the files stored in the directory, e.g., logical inode numbers (LINs) of the files stored in the directory. Other example file system objects are discussed with FIG. 5 below.

In one or more embodiments, descriptions the above-described non-file system objects (and references to corresponding inodes) can be stored in data structures adapted to be used to rapidly perform file system functions. Data structures that can be modified by one or more embodiments described herein include file system B-tree data structures that can maintain data to facilitate operations including rapid searching, sequential access, insertions, and deletions, e.g., inode B-trees.

One having skill in the relevant art(s), given the description herein, appreciates that both file data and inode object data can be stored using B-tree data structures. In one or more embodiments, inode B-trees are used to store entity information (e.g., directory contents and metadata) that is smaller than the entity information for file data, e.g., the contents of files and metadata.

As depicted in FIG. 3, in some circumstances, one or more embodiments can provide concurrent update mechanisms that handle file data 310A-B differently from relatively smaller file system object descriptors 320A-F. For example, in one or more embodiments, file data 310A is depicted spanning leaf nodes 350A-B, and in some implementations file data 310A can be concurrently updated by multiple processes, e.g., with leaf node write lock 365 being applied to the portion of file data 310A that is stored on leaf node 350A, e.g., data changes 360A-B concurrently modifying portions 315A-B respectively (e.g., with a leaf node write lock being used, but not being depicted for leaf node 350B). This approach is a type of fine-grain locking that can be applied to updates that are separated enough to lie in separate leaves of the file B-tree 380. Updates to file data 310A-B which are closer together, including updates to files too small to require more than a single B-tree leaf node 350A-B (e.g., a non-limiting example size being 5-10 MB), are serialized.

For file system object descriptors 320A-F, one having skill in the relevant art(s), given the description herein, understands that the fine-grain locking approach applied to file data 310A-B can have disadvantages when applied to small logical updates, such as file system object descriptors 320A-F, e.g., smaller stored objects that do not span multiple leaf nodes 350A-B and even have multiple entries stored per leaf node.

One or more embodiments of a logical operation coalescer (also termed coalescing component 128 and coalescing equipment 170) discussed further below with FIGS. 4-5, can persist small logical updates by attaching the updates to the inode of the file or directory being updated. Supporting persistence of small logical updates can facilitate concurrent persistent operations with granularity finer than B-tree 380 leaf node 350A-B level, in accordance with one or more embodiments. In some circumstances, by storing updates at the inode level, one or more embodiments can facilitate cross-node concurrency and simplify the recovery process when a node goes down.

Figure 4:
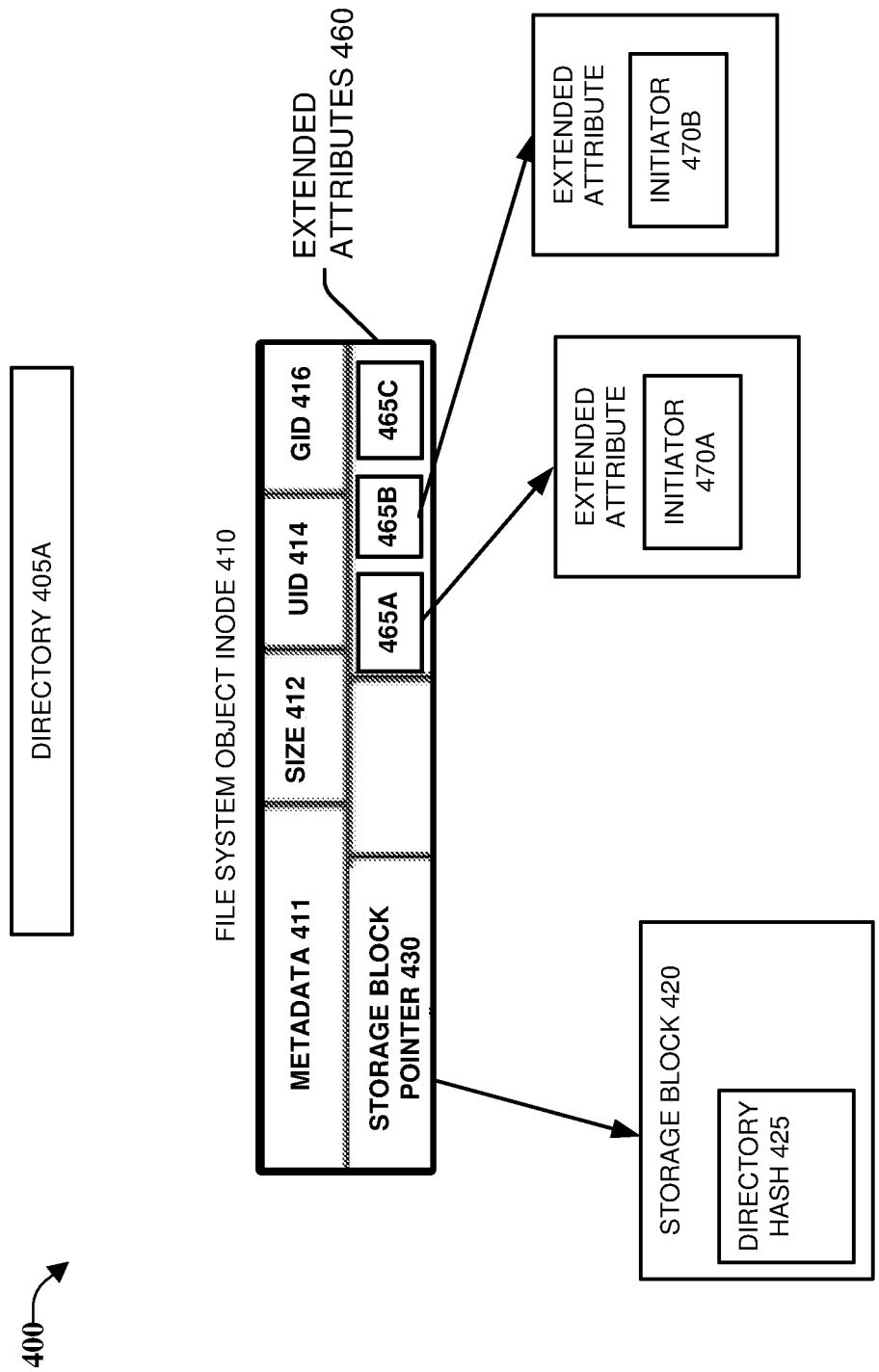
FIG. 4 depicts a diagram of a non-limiting system where an inode can facilitate fine-grained locking of small logical updates using extended attribute capabilities of the inode, in accordance with one or more embodiments.

FIG. 4 depicts a diagram of a non-limiting system 400 where an inode can facilitate fine-grained locking of small logical updates using extended attribute capabilities of the inode, in accordance with one or more embodiments. For purposes of brevity, description of like elements and/or processes employed in other embodiments is omitted.

As depicted, system 400 includes directory 405A with metadata stored by file system object inode 410. File system inode includes some sample attributes, e.g., metadata 411, size 412, UID 414, GID 416, storage block pointer 430, and extended attributes 460. Storage block pointer 430 references physical storage block 425. Extended attribute 465A references a data manipulation initiator 470A and extended attribute 465B references data manipulation initiator 470B.

In one or more embodiments, a file or directory that is expected to receive concurrent updates can have a number of "delta" blocks attached to a related inode via a new extended attribute, e.g., extended attributes 460 of file system object inode 410 that is related to and describes directory 405A. These blocks can be used to facilitate concurrent changes to the same small portion of inode 410, e.g., metadata 411.

With additional embodiments of the logical operation coalescer described herein, extended attributes 460 of files or file system objects (e.g., inode 410) can be used to attach blocks to inode 410 for multiple inode object updates being performed by one or more modifying processes, e.g., data write, directory link, etc. To facilitate processing, the delta blocks described above can be used to store the addresses of the secondary blocks, and the B-tree position (file offset for files, name hash for directories, etc.) of the corresponding update. In one or more embodiments, these secondary blocks can be written to the journal, making these updates stable changes to the data store.

In an example implementation, while the secondary blocks are written to the journal (e.g., cache 167), the updates can be aggregated from the journal and flushed to their final locations in the B-tree before the journal is forced to flush the secondary block contents to the disk storage devices, e.g., storage component 162.

This mechanism can, in some embodiments, support concurrent updates from multiple initiator nodes, e.g., each initiator node can allocate its own delta block, and control the allocation of individual address fields within that delta block. Control of updates to different parts of the B-tree can be under a fine-grained distributed lock. On lock contention, in accordance with one or more embodiments, an initiator node can flush entries protected by the contended lock to the B-tree before giving up the lock.

In an example, one or more embodiments can lock, (e.g., by locking component 124) the first part and the second part of the entry, e.g., a filesystem object descriptors 320A-B of leaf node 350A locked by using extended attributes 460 of inodes referenced by filesystem object descriptors 320A-B.

Figure 5:
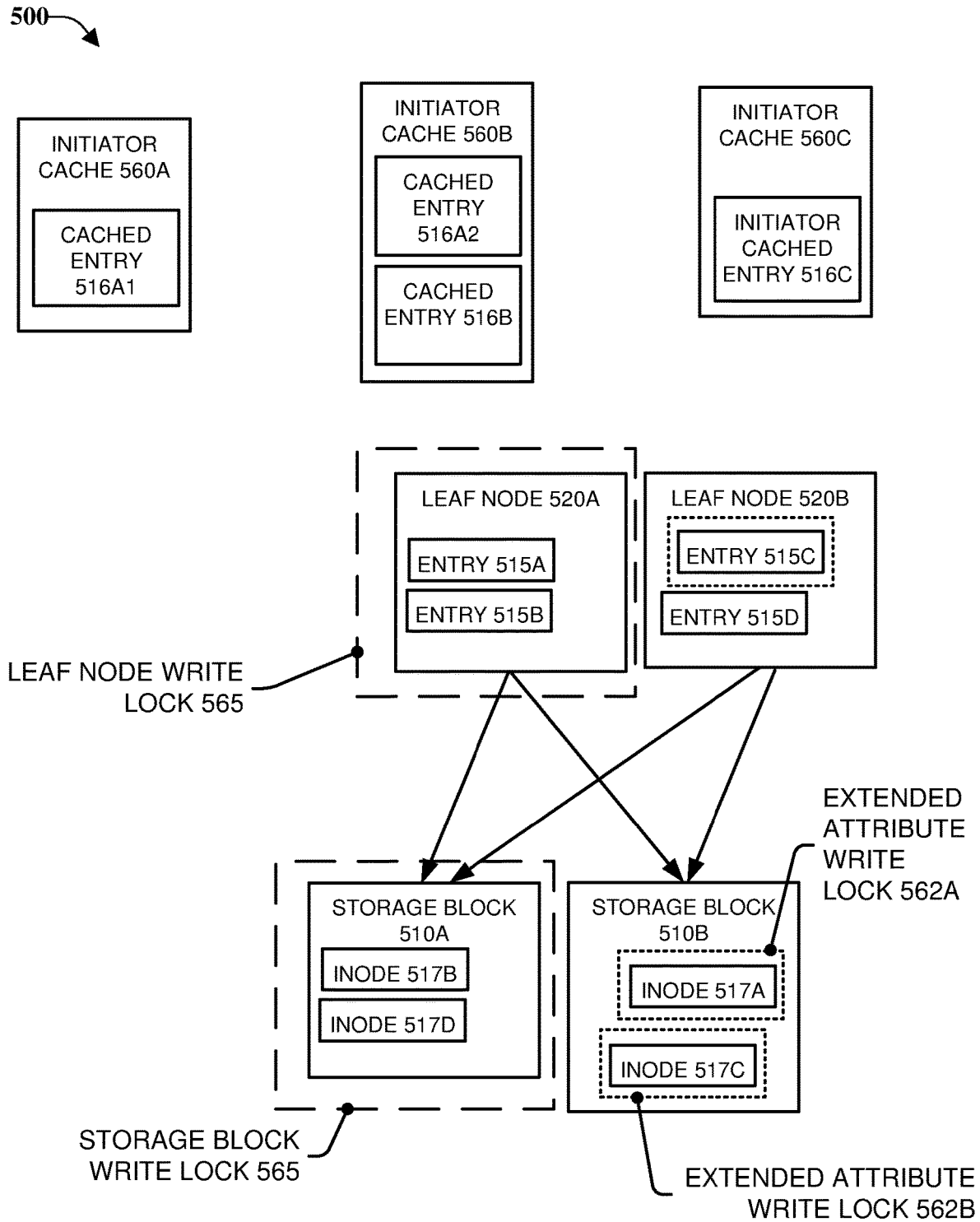
FIG. 5 depicts a system that can facilitate using various types of write locks to facilitate concurrent modification of inode-based system objects, in accordance with one or more embodiments.

FIG. 5 depicts a system 500 that can facilitate using various types of write locks to facilitate concurrent modification of inode-based system objects, in accordance with one or more embodiments. For purposes of brevity, description of like elements and/or processes employed in other embodiments is omitted. As depicted, system 500 includes initiator caches 560A-C, leaf 520A-B, and storage blocks 510A-B. Storage block 510A includes inodes 517A and 517D, and storage block 510B includes inodes 517B-C. Binary tree (not shown) leaf nodes 520A-B respectively include leaf entries 515A-B and 515C-D. In the example depicted, inodes 517A-D correspond to entries 515A-D.

As is appreciated by one having skill in the relevant art(s), given the description herein, storage blocks 510A-B, with respect to inodes 517A-D, can represent any combination of stable (journaled) cached versions (e.g., stored in cache 167), versions written to physical storage (e.g., storage block 169 in storage component 162). Initiator caches 560A-B respectively include cached entries 516A1-A2 (cached versions of leaf entry 515A), initiator cache 560B further includes cached entry 515B. It is further appreciated that entries 515A-C are represented by cached entries 516A-C of initiator caches 560A-C. Further details are provided with examples below. Leaf node 520A is subject to leaf node write lock 565, storage block 510A is subject to storage block write lock 565, and Mode 517C is subject to extended attribute write lock 562B, e.g., based on extended attributes similar to extended attributes 460 discussed above.

In another example or extended attribute locking, as depicted in FIG. 5, a first and second data manipulation process can be allocated initiator caches 560A-B, with the first process and second process both requesting a change to Mode 517A, and a third process, using initiator cache 560C, requests a change to Mode 517C. It is appreciated by one having skill in the relevant art(s), given the description herein, that different factors can influence which locks are selected in response to concurrent requests, including, but not limited to the 'hot' character of data blocks (e.g., blocks with relatively frequent modifications by multiple processes).

In this example, because both Mode 517A and 517C are requested, with Mode 517A being requested twice, one or more embodiments can select the use of extended attribute write locks 562A-B to facilitate concurrent writes by the first, second, and third processes.

In a variation of the above example, as depicted, Mode 517B is only requested by the second process. For this relatively 'cold' storage block 510B, instead of an extended attribute lock on Mode 517B, one or more embodiments can select storage block write lock 565. This type of lock selected by embodiments can provide benefits based on fine-grained initiator ownership of one or more storage blocks.

Figure 6:
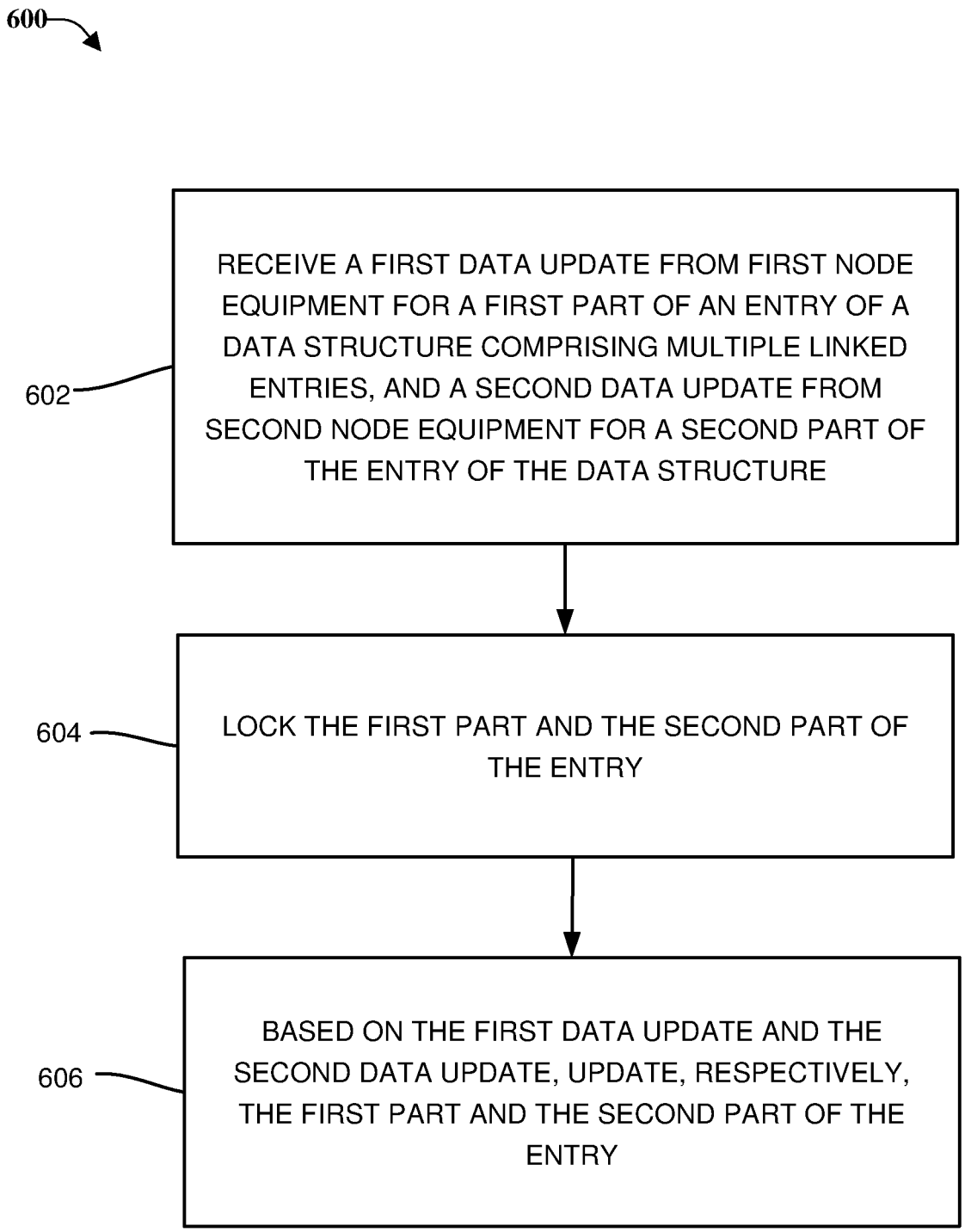
FIG. 6 depicts a flow diagram representing example operations of an example method 600 that can facilitate using logical operation coalescing to concurrently update file system objects, in accordance with one or more embodiments.

FIG. 6 depicts a flow diagram representing example operations of an example method 600 that can facilitate using logical operation coalescing to concurrently update file system objects, in accordance with one or more embodiments. For purposes of brevity, description of like elements and/or processes employed in other embodiments is omitted.

In some examples, one or more embodiments of method 600 can be implemented by receiving component 122, locking component 124, updating component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can, in one or more embodiments, receive a first data update from first node equipment for a first part of an entry of a data structure comprising multiple linked entries, and a second data update from second node equipment for a second part of the entry of the data structure. At 604 of method 600, locking component 124 can, in one or more embodiments, based on the resource sharing communication lock the first part and the second part of the entry. At 606 of method 600, updating component 126 can, in one or more embodiments, based on the first data update and the second data update, update, respectively, the first part and the second part of the entry.

Figure 7:
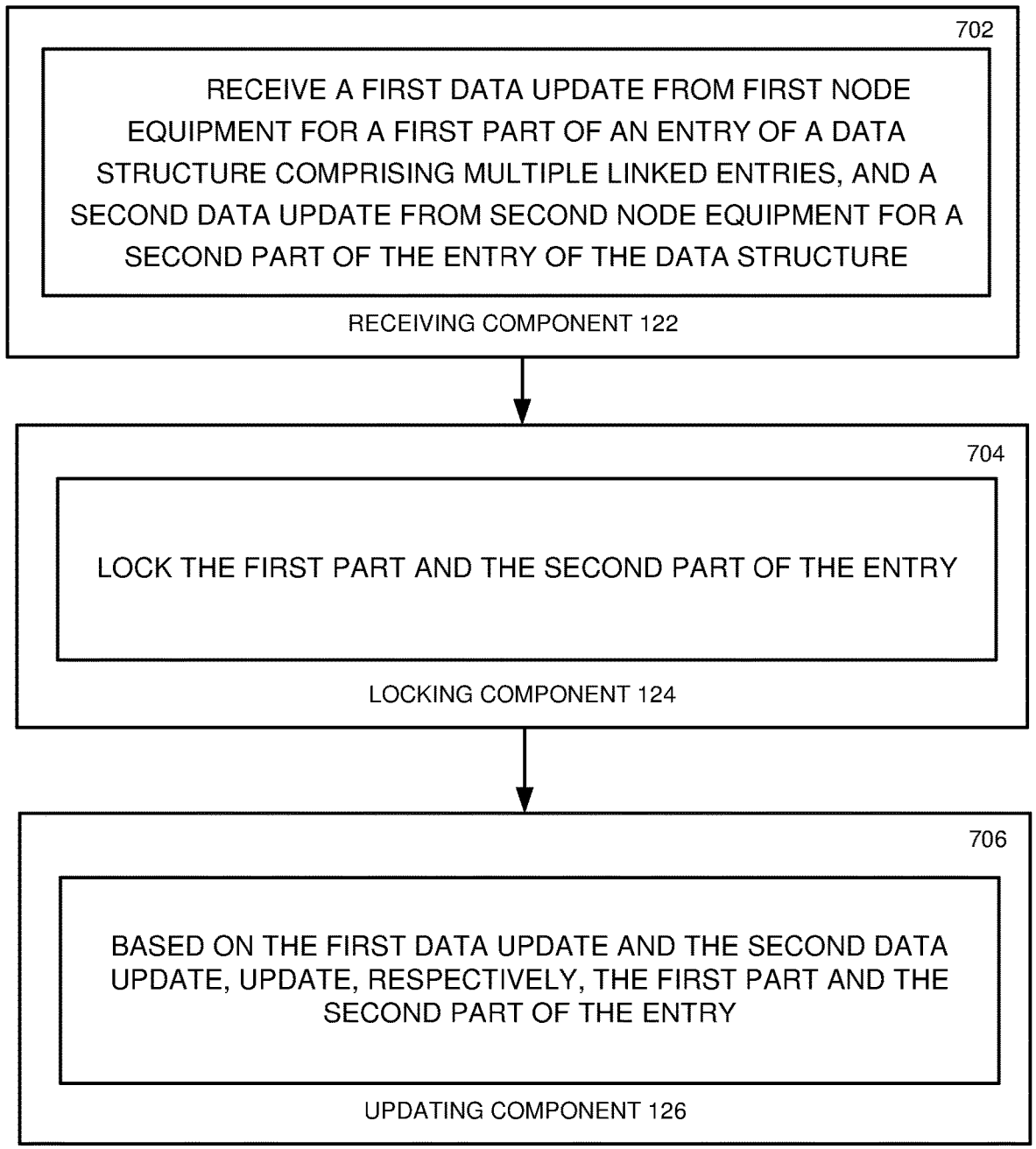
FIG. 7 depicts an example system that can facilitate monitoring file sharing commands between network equipment to identify adverse conditions, in accordance with one or more embodiments.

FIG. 7 depicts an example system 700 that can facilitate monitoring file sharing commands between network equipment to identify adverse conditions, in accordance with one or more embodiments. For purposes of brevity, description of like elements and/or processes employed in other embodiments is omitted. Example system 700 can include receiving component 122, locking component 124, updating component 126, and other components that can be used to implement aspects of system 700, as described herein, in accordance with one or more embodiments.

At 702 of FIG. 7, receiving component 122 can receive, by first computing equipment comprising a processor, a first data update from first node equipment for a first part of an entry of a data structure comprising multiple linked entries, and a second data update from second node equipment for a second part of the entry of the data structure. At 704 of FIG. 7, locking component 124 can, based on the resource sharing communication, lock, by the first computing equipment, the first part and the second part of the entry. At 706 of FIG. 7, updating component 126 can, based on the first data update and the second data update, update, by the first computing equipment, respectively, the first part and the second part of the entry.

Figure 8:
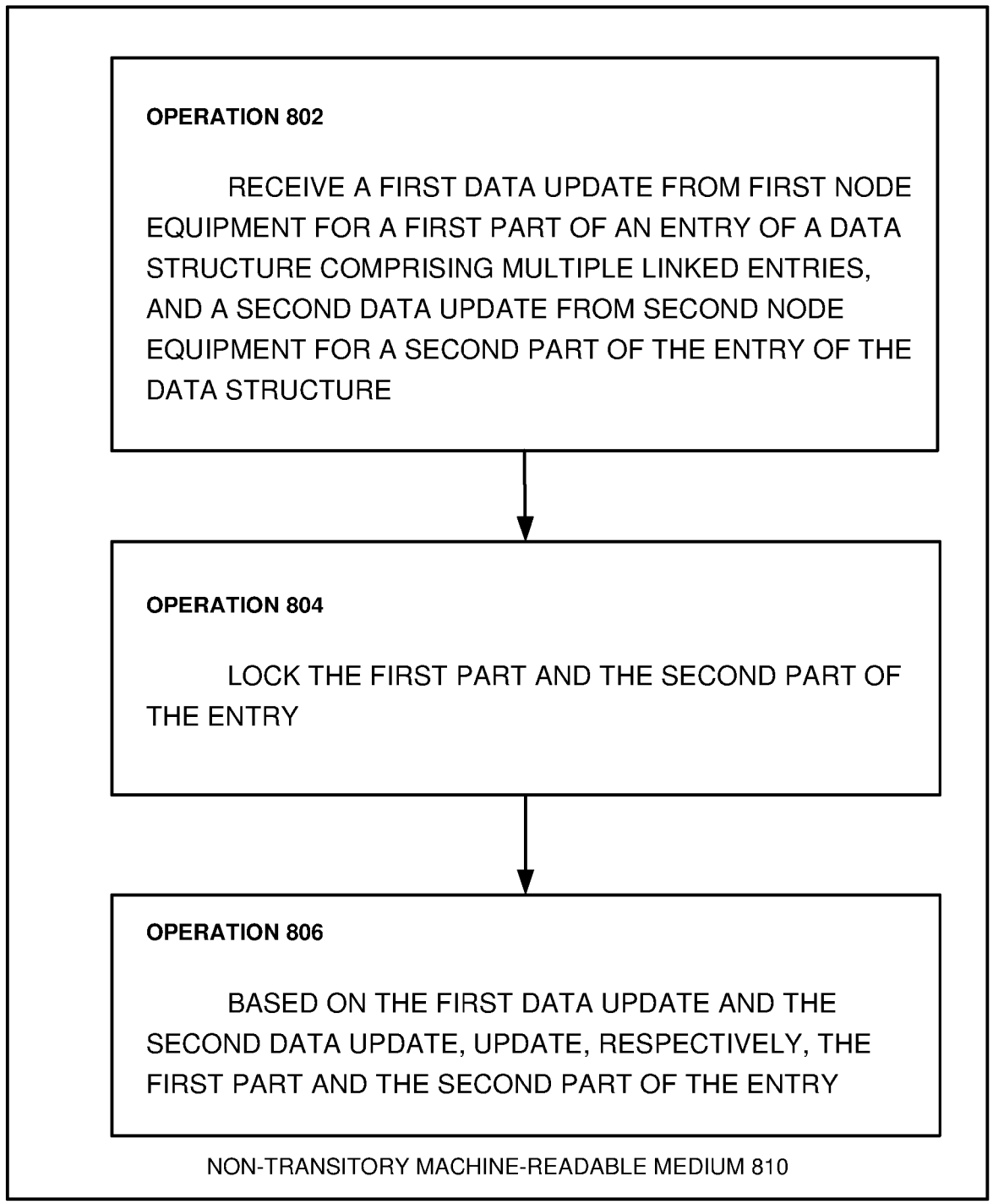
FIG. 8 depicts an example non-transitory machine-readable medium that can include executable instructions that, when executed by a processor of a system, facilitate using logical operation coalescing to concurrently update file system objects.

FIG. 8 depicts an example non-transitory machine-readable medium 800 that can include executable instructions that, when executed by a processor of a system, facilitate using logical operation coalescing to concurrently update file system objects. For purposes of brevity, description of like elements and/or processes employed in other embodiments is omitted.

Operation 802 of FIG. 8 can facilitate generation of receiving component 122, which, in one or more embodiments, can receive a first data update from first node equipment for a first part of an entry of a data structure comprising multiple linked entries, and a second data update from second node equipment for a second part of the entry of the data structure. Operation 804 of FIG. 8 can facilitate generation of locking component 124 which, in one or more embodiments, can lock the first part and the second part of the entry. Operation 806 of FIG. 8 can facilitate generation of updating component 126 which, in one or more embodiments, can, based on the first data update and the second data update, update, respectively, the first part and the second part of the entry.

Figure 9:
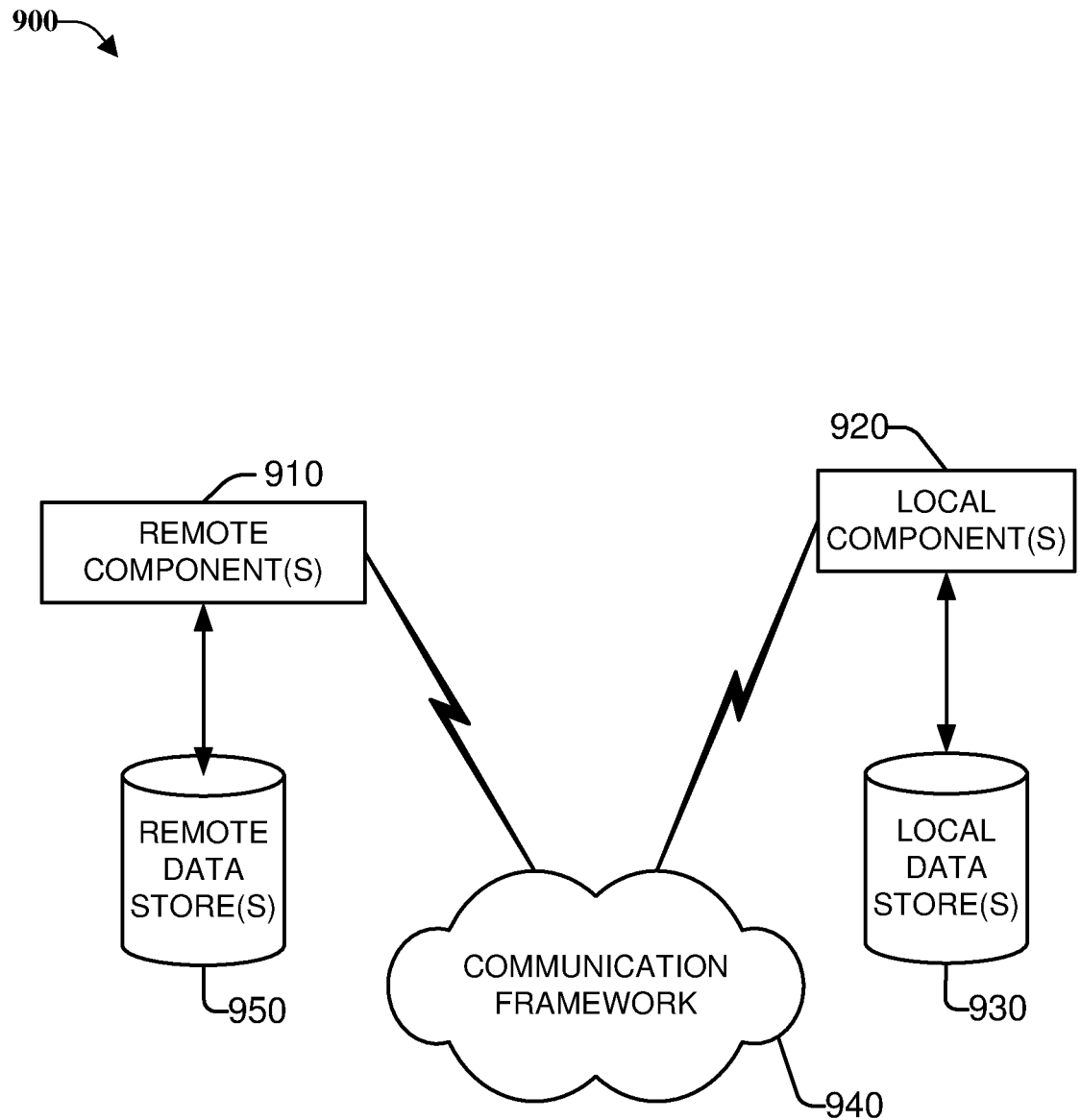
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
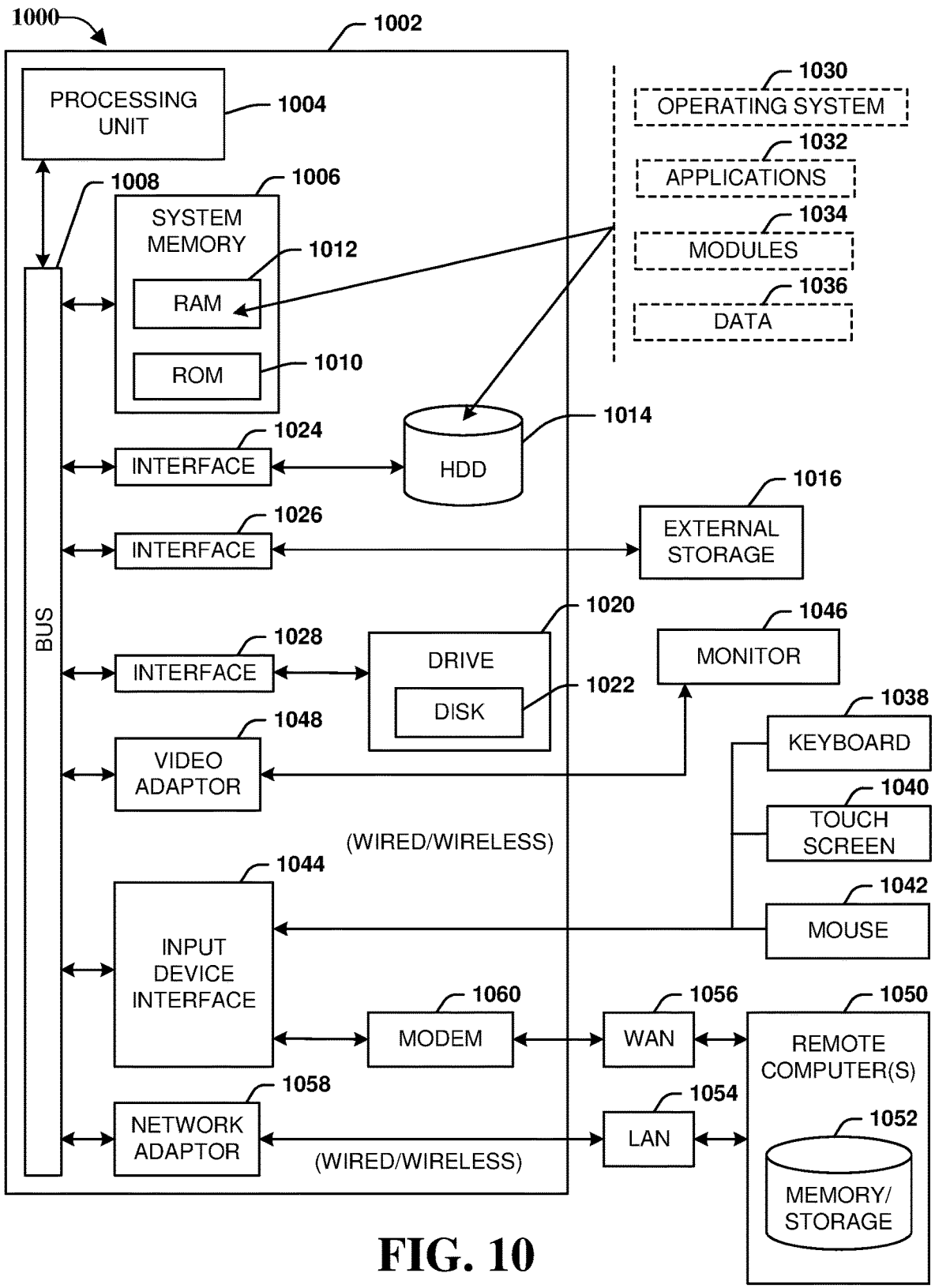
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by first computing equipment comprising a processor, a first data update from first node equipment for a first part of an entry of a data structure comprising multiple linked entries, and a second data update from second node equipment for a second part of the entry of the data structure, wherein the data structure comprises a search tree comprising interconnected leaves of data, wherein the entry comprises a leaf of the interconnected leaves of data comprised in the search tree, wherein the first part of the entry comprises a first portion of the leaf, and wherein the second part of the entry comprises a second portion of the leaf;
   locking, by the first computing equipment, the first part and the second part of the entry while leaving a third portion of the leaf unlocked; and
   based on the first data update and the second data update, updating, by the first computing equipment, respectively, the first part and the second part of the entry.

2. The method of claim 1, wherein locking the first part and the second part of the entry comprises a first lock and a second lock that respectively prevent changes to the first part of the entry and the second part of the entry by nodes other than the first node equipment and the second node equipment.

3. The method of claim 2, wherein the first lock comprises a lock preventing changes to a physical block of data corresponding to the first part of the entry, wherein the lock preventing changes to the physical block of data was selected based on the first data update and the second data update corresponding to the first part of the entry and the second part of the entry being on the leaf.

4. The method of claim 2, wherein the entry comprises directory metadata corresponding to a directory of files stored in a file system, and wherein the directory metadata are stored in an inode for the directory, and wherein the first lock comprises a lock facilitated by an changing an extended attribute of the inode.

5. The method of claim 4, wherein changing the extended attribute comprises changing the extended attribute to comprise metadata specifying a scope of the first lock.

6. The method of claim 4, further comprising, facilitating, by the first computing equipment, respectively, based on the first data update and the second data update, generating, by coalescing equipment, a first cache entry of a cache and a second cache entry of the cache, wherein the first part and the second part of the entry are respectively allocated to the first node equipment and the second node equipment and updated based on the first cache entry and the second cache entry.

7. The method of claim 6, further comprising:
during the locking of the first part of the entry, receiving, by the first computing equipment, a third update for the first part of the entry; and
based on the third update and the locking of the first part of the entry, facilitating, by the first computing equipment, generating a third cache entry of the cache, wherein updating the first part of the entry is based on an aggregated update generated by the coalescing equipment based on the third cache entry and the first cache entry.

8. The method of claim 7, wherein the first data update comprises an update to the inode, and wherein updating the first part of the entry is based on data corresponding to the first data update received from a first cached value linked to the inode.

9. The method of claim 2, wherein the search tree comprises a B-tree data structure.

10. The method of claim 9, wherein the B-tree data structure comprises a system B-tree data structure.

11. The method of claim 1, wherein the entry comprises logical references to files in a data recovery snapshot.

12. Coalescing equipment, comprising:
a memory that stores computer executable components; and
a processor that executes the computer executable components stored in the memory, wherein the computer executable components comprise:
a receiving component that receives a first data update for a first part of a node of a hierarchical data structure, and a second data update for a second part of the node, wherein the first part and the second part of the node comprise file directory data and respectively correspond to a first file and a second file arranged in a file directory wherein the hierarchical data structure comprises a search tree comprising interconnected leaves of data, wherein the first part of the node comprises a first portion of a leaf of the search tree, and wherein the second part of the node comprises a second portion of the leaf;
a locking component that locks the first part of the leaf and the second part of the leaf while leaving a third portion of the leaf of the search tree unlocked;
a caching component that, based on the first data update and the second data update, generates a first cache entry of a cache and a second cache entry of the cache, and
a coalescing component that, based on an aggregated update generated from the first cache entry and the second cache entry, initiates updating the first portion of the leaf and the second portion of the leaf.

13. The coalescing equipment of claim 12, wherein the caching component further links the first cache entry and the second cache entry to an inode corresponding to the file directory.

14. The coalescing equipment of claim 12, wherein the search tree comprises a B-tree data structure.

15. A non-transitory machine-readable medium comprising executable instructions that, when executed by a processor of a first computing device, facilitate performance of operations, the operations comprising:
receiving a first data change for first computer file data referenced by a leaf node of a search data structure and a second data change for second computer file data referenced by the leaf node;
locking with a lock a first portion of the leaf node corresponding to storage of the first computer file data and the second computer file data, leaving a second portion of the leaf node unlocked;
caching the first data change and the second data change, resulting in cached changes; and
receiving a coalesced change for updating the first portion of the leaf node, generated based on combining the cached changes.

16. The non-transitory machine-readable medium of claim 15, wherein the first computer file data comprises directory metadata corresponding to a directory of files stored in a file system.

17. The non-transitory machine-readable medium of claim 16, wherein the first data change comprises an update to an inode associated with the directory.

18. The non-transitory machine-readable medium of claim 15, wherein the first portion of the leaf node corresponds to logical references to files of a data recovery snapshot.

19. The non-transitory machine-readable medium of claim 15, wherein the lock comprises a lock preventing changes to a physical block of data corresponding to the first computer file data.

20. The non-transitory machine-readable medium of claim 19, wherein the lock:
prevents changes to a physical block of data, and
was selected based on the first data change corresponding to the first portion leaf node.

* * * * *